(12) United States Patent
Hiro et al.

(10) Patent No.: US 6,192,704 B1
(45) Date of Patent: Feb. 27, 2001

(54) ABSORBER OF ABSORPTION SYSTEM REFRIGERATOR

(75) Inventors: Naoki Hiro; Yoshio Ozawa; Kenji Nasako; Hiroyuki Hashimoto, all of Moriguchi (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/381,700
(22) PCT Filed: Mar. 23, 1998
(86) PCT No.: PCT/JP98/01289
 § 371 Date: Sep. 23, 1999
 § 102(e) Date: Sep. 23, 1999
(87) PCT Pub. No.: WO98/43027
 PCT Pub. Date: Oct. 1, 1998

(30) Foreign Application Priority Data

Mar. 25, 1997 (JP) .................................................. 9-072096
Mar. 25, 1997 (JP) .................................................. 9-072097
Jan. 28, 1998 (JP) .................................................. 10-016057

(51) Int. Cl.[7] .............................. F25B 15/12; F25B 15/00
(52) U.S. Cl. .................................. 62/484; 62/476; 62/494
(58) Field of Search .............................. 62/484, 494, 476

(56) References Cited

U.S. PATENT DOCUMENTS 5,499,516 * 3/1996 Anderson et al. ..................... 62/494
5,730,001 * 3/1998 Furukawa ........................... 62/484 X

FOREIGN PATENT DOCUMENTS

| 68970/1992 | 6/1992 | (JP) . |
| 5-322375 | 12/1993 | (JP) . |
| 405322375 | * 12/1993 | (JP) . |
| 8-178471 | 7/1996 | (JP) . |

* cited by examiner

Primary Examiner—Corrine McDermott
Assistant Examiner—Chen-Wen Jiang
(74) Attorney, Agent, or Firm—Armstrong, Westerman, Hattori, McLeland & Naughton, LLP

(57) ABSTRACT

The absorber for use in absorption chillers of the present invention comprises a plurality of cooling water pipes 2 extending horizontally in the interior of the absorber chamber. A plurality of flat heat transfer plates 1 are spaced apart from one another and arranged horizontally in a vertical position, and the plurality of cooling water pipes 2 extend through these heat transfer plates 1 perpendicular thereto. The pitch Pd of the plates 1 is 3 to 15 mm. Each heat transfer plate 1 is integrally formed on its upper end face with an absorbent receptacle 10 V-shaped in cross section and extending longitudinally of the upper end face. The bottom portion of the receptacle 10 is formed with two rows of absorbent holes 11 positioned upwardly of respective surfaces of the plate 1. The holes 11 of each row are spaced apart from one another longitudinally of the plate 1 and each have an outlet adjoining the surface of the plate 1. This enables an absorber to have a higher absorbing capacity than conventional absorbers.

14 Claims, 13 Drawing Sheets

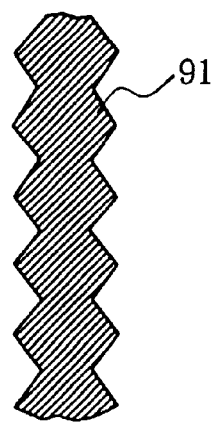
F I G. 11(a)
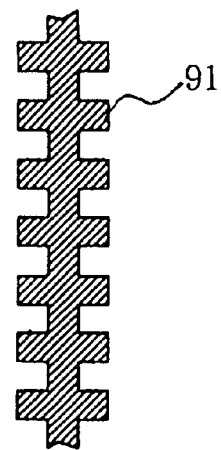
F I G. 11(b)
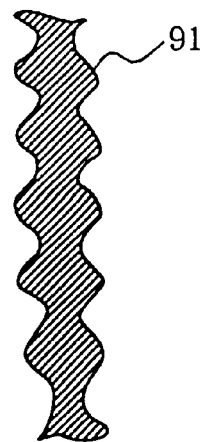
F I G. 11(c)

(mm)

ABSORBER OF ABSORPTION SYSTEM REFRIGERATOR

TECHNICAL FIELD

The present invention relates to absorbers for use in absorption chillers for causing an absorbent to absorb a vapor of refrigerant produced by an evaporator.

BACKGROUND ART

With reference to FIG. 17, double-effect absorption chillers have a closed drum 3 provided in its interior with an eliminator 30, and an evaporator chamber 31 and an absorber chamber 32 which are arranged at opposite sides of the eliminator 30. An evaporator (not shown) is disposed in the evaporator chamber 31, and an absorber 50 in the absorber chamber 32. Connected to the bottom of the closed drum 3 is piping 62 extending to a high-temperature generator via a low-temperature heat exchanger and a high-temperature heat exchanger, with an absorbent pump 6 mounted on an intermediate portion of the piping 62.

The absorber 50 comprises an absorbent sprinkler 4 connected to one end of piping 61 extending from the low-temperature heat exchanger, and a cooling water piping system comprising a plurality of cooling water pipes 2 extending horizontally.

In the absorber 50, an absorbent (aqueous solution of lithium bromide) is scattered on the cooling water pipes 2 by the sprinkler 4 as indicated in broken lines. During falling, the absorbent absorbs a vapor of refrigerant produced by the evaporator, has its temperature raised by the heat of condensation and heat of mixing (heat of absorption) then generated, and is cooled with cooling water flowing through the pipes 2.

The absorbent scattered by the sprinkler 4 in the conventional absorber 50 first falls onto the outer peripheral surfaces of the cooling water pipes 2 at the uppermost stage, flows down the peripheral surfaces in the form of drops and thereafter falls onto the outer peripheral surfaces of the cooling water pipes 2 at the next lower stage. In this way, the absorbent is delivered in the form of drops to the pipes 2 from stage to stage downward. Accordingly, the absorbent not only falls at a relatively high speed under gravity but also fails to sufficiently spread over the outer peripheral surfaces of the pipes 2, and therefore has a small area for absorbing the refrigerant vapor and wets the pipe surfaces over small areas. The absorber consequently has the problem of being low in absorbing capacity due to insufficient absorption and heat exchange.

Accordingly, an object of the present invention is to provide an absorber having a higher absorbing capacity than conventional absorbers.

DISCLOSURE OF THE INVENTION

The present invention provides an absorber for use in absorption chillers which has a closed chamber to be supplied with an absorbent and a refrigerant vapor and having installed therein means for supplying the absorbent. For example, the conventional absorbent sprinkler 4 is usable as the absorbent supplying means. Positioned below the absorbent supplying means is a cooling water piping system comprising a plurality of cooling water pipes which extend horizontally and are interconnected in series or in parallel. A plurality of platelike heat transfer bodies are spaced apart from one another and arranged in a vertical position horizontally. The cooling water pipes extend through these heat transfer bodies.

With the absorber described for use in absorption chillers, cooling water is supplied to the pipes to cool the surfaces of the heat transfer bodies and the pipes with the water to a sufficiently lowered temperature.

The absorbent is supplied by the absorbent supplying means to the surfaces of the heat transfer bodies. The absorbent then flows down the surfaces of the heat transfer bodies and the outer peripheral surfaces of the cooling water pipes while spreading over the surfaces of the heat transfer bodies. While flowing in this way, the absorbent absorbs a vapor of refrigerant passing between the heat transfer bodies by coming into contact with the refrigerant vapor over a sufficient area.

While flowing down the surfaces of the heat transfer bodies, the absorbent wets these surfaces over large areas. Moreover, the absorbent is slowed down by flow resistance and therefore flows down the surfaces of the heat transfer bodies over a sufficient period of time. This effects sufficient heat exchange with these surfaces, whereby the absorbent is effectively cooled.

Thus, the absorbent comes into contact with the refrigerant vapor over a large area for the absorption of the vapor, and the resulting heat is effectively removed by sufficient heat exchange. As a result, a high absorbing capacity is available.

Stated more specifically, each of the heat transfer bodies comprises a single heat transfer plate.

According to another specific embodiment, the cooling water pipes are arranged in a plurality of stages spaced apart from one another vertically, and each of the heat transfer bodies comprises a plurality of heat transfer plates each of which is provided for one or at least two stages of the pipes.

The heat transfer plates extend horizontally. The upper of each pair of heat transfer plates which are vertically adjacent to each other has a lower end spaced apart by a predetermined clearance from the upper end of the lower of the pair. The clearance is preferably 2 mm to 3 mm. Each heat transfer plate has one or at least two stages of cooling water pipes extending therethrough. All the heat transfer plates or the heat transfer plates other than the plate at the uppermost position each have an upper end face positioned at the same level as or approximately the same level as upper ends of outer peripheral surfaces of the cooling water pipes positioned at the uppermost stage and extending through the heat transfer plate.

With the absorber having the construction described, the absorbent is supplied by the absorbent supplying means to the surface of each of the uppermost heat transfer plates and thereafter flows down the surfaces of heat transfer plates and the outer peripheral surfaces of cooling water pipes. In this process, the absorbent flowing down the outer peripheral surface of one pipe will partly fall off that pipe to flow down the surface of the plate. At this time, the portion of absorbent thus flowing will combine with a downflow portion of the absorbent falling off another pipe laterally adjacent to the above-mentioned pipe. The confluent flow will then pass between two cooling water pipes arranged at the next lower stage.

Even when such a flow of absorbent occurs in the absorber, the absorbent partly spreads leftward and rightward along the lower end face of one heat transfer plate or along the upper end face of another heat transfer plate positioned therebelow upon the absorbent flow reaching the plate lower end face. The absorbent then reaches the upper end of outer peripheral surface of one of the uppermost cooling water pipes extending through the lower heat transfer plate, whereupon the absorbent flows down along the pipe outer peripheral surface.

The absorbent flowing down the surfaces of the heat transfer plates and the outer peripheral surfaces of the cooling water pipes spreads as described above every time the absorbent passes across the clearance between the plates, to flow down as fully spread not only over the plate surfaces and also over the pipe outer peripheral surfaces. As a result, the heat transfer plates, i.e., the platelike heat transfer bodies, produce the effect described, while the cooling water pipes fully exhibit a direct cooling effect to result in a high absorbing capacity.

Stated specifically, the platelike heat transfer bodies are arranged with a pitch of 3 mm to 15 mm.

While flowing down the surfaces of the heat transfer bodies, the absorbent absorbs the refrigerant vapor passing between the heat transfer bodies by coming into contact with the vapor. As the pitch of the heat transfer bodies decreases, the portions of absorbent flowing down the opposed surfaces of each pair of adjacent heat transfer bodies approach each other. These absorbent portions combine to flow down if the pitch becomes smaller than 3 mm, consequently blocking the flow channel of the refrigerant vapor. The refrigerant vapor then fails to contact the absorbent over a sufficient area to result in a greatly impaired absorbing capacity.

Further as the pitch of the heat transfer bodies increases, the number of heat transfer bodies arranged over the entire length of the cooling water pipes decreases, reducing the refrigerant vapor absorbing area of the absorbent and the area of the heat transfer bodies wetted with the absorbent (the area, $m^2$, of contact between the surfaces of the heat transfer bodies and the absorbent adhering to the surfaces). When the pitch exceeds 15 mm, it is impossible to obtain an amount of absorption and an amount of heat exchange which are much greater than those obtained by the conventional absorber having no platelike heat transfer bodies.

Accordingly, it is desired that the pitch of the heat transfer bodies be in the range of 3 to 15 mm.

Stated more specifically, each heat transfer body is in the form of a plate corrugated in a vertical direction. Alternatively the heat transfer body is subjected to surface working and thereby formed with ridges and furrows arranged along a vertical direction.

When thus shaped, the heat transfer body offers increased flow resistance to the downflow of the absorbent, giving a smaller flow rate to the absorbent than the heat transfer body in the form of a flat vertical plate, affording an increased absorbing area to the absorbent and enabling the absorbent to wet the heat transfer body over an increased area, whereby an increased amount of absorption and a larger amount of heat exchange can be obtained.

Further stated more specifically, each heat transfer body is formed with a plurality of vapor passing apertures positioned away from the outer peripheries of the cooling water pipes.

The refrigerant vapor supplied to the closed chamber is then caused to flow through the heat transfer body by way of the vapor passing apertures in addition to the flow along the heat transfer body. Accordingly, the refrigerant vapor uniformly flows through the closed chamber without being impeded by the heat transfer bodies and becomes fully absorbed by the absorbent.

Further stated more specifically, the absorbent supplying means comprises a downflow distributor for allowing the absorbent to flow down the plurality of heat transfer bodies, and a feeder for supplying the absorbent to the downflow distributor. The downflow distributor comprises an absorbent receptacle for retaining therein the absorbent to be allowed to flow downward. The receptacle has a bottom formed with a plurality of absorbent holes for causing the absorbent to flow down therethrough. The absorbent holes each have an outlet positioned in proximity to the surface of the heat transfer body.

The absorbent is supplied to the downflow distributor from the feeder of the absorbent supplying means thus constructed. The absorbent temporarily remains in the receptacle of the downflow distributor and then flows out of the outlets of the absorbent holes. The absorbent flowing out of the outlets of the holes immediately flows along the surfaces of the heat transfer bodies and further flows down these surfaces and the outer peripheral surfaces of the cooling water pipes while spreading over the transfer body surfaces. The absorbent flowing down from the absorbent receptacle wholly flows downward along the transfer body surfaces.

If the absorber is not provided with the downflow distributor, on the other hand, the absorbent supplied from above the heat transfer bodies toward these bodies is likely to partly flow dropwise between each pair of opposed heat transfer bodies along the water pipes at the uppermost stage and then along lower water pipes from stage to stage downward without flowing down the transfer bodies.

With the absorber having the construction described above, a larger amount of absorbent flows down the surfaces of the heat transfer bodies than in the absence of the downflow distributor, giving the absorbent an increased absorbing area and permitting the absorbent to wet an increased area. As a result, an increased amount of absorption and a larger amount of heat exchange are available.

Further stated more specifically, the absorbent receptacle is provided for each heat transfer body as joined to the upper end face thereof and extends longitudinally of the upper end face.

Since the absorbent receptacle is thus joined to each heat transfer body to form a unit, the number of heat transfer bodies can be altered in designing the absorber merely by varying the number of units, and there is no need to determine the size and shape of the downflow distributor again in accordance with the number. Accordingly, the absorber is easy to alter in design.

According to another specific embodiment, the absorbent receptacle of the downflow distributor is connected to all the platelike heat transfer bodies across the upper ends thereof and dimensioned to contain the upper ends of all the heat transfer bodies.

According to this construction, at least one absorbent supply pipe may be connected to the absorbent receptacle. Thus, the feeder can be provided by the single absorbent supply pipe and is simplified in construction.

Stated more specifically, the absorbent holes of the downflow distributor are each in the form of a slit having an outlet extending along the surface of the heat transfer body.

The absorbent then remaining in the absorbent receptacle of the downflow distributor flows out of each absorbent hole in the form of a thin film and flows down as spread over the surface of the heat transfer body. The structure described therefore gives the absorbent an increased absorbing area and permits the absorbent to wet an increased area, with the result that an increased amount of absorption and a larger amount of heat exchange can be obtained.

As compared with conventional absorbers, the absorber embodying the present invention for use in absorption chillers enables the absorbent to contact the refrigerant vapor over a larger area for the absorption of the vapor, while the resulting heat can be removed effectively by sufficient heat exchange. The present absorber therefore has a remarkably improved absorbing capacity.

BRIEF DESCRIPTION OF THE DRAWINGS

FIG. 11 includes sectional views showing heat transfer plates which are different in sectional shape;

BEST MODE OF CARRYING OUT THE INVENTION

Absorbers embodying the present invention for use in double-effect absorption chillers will be described below in detail with reference to the drawings.

First Embodiment

Figure 17:
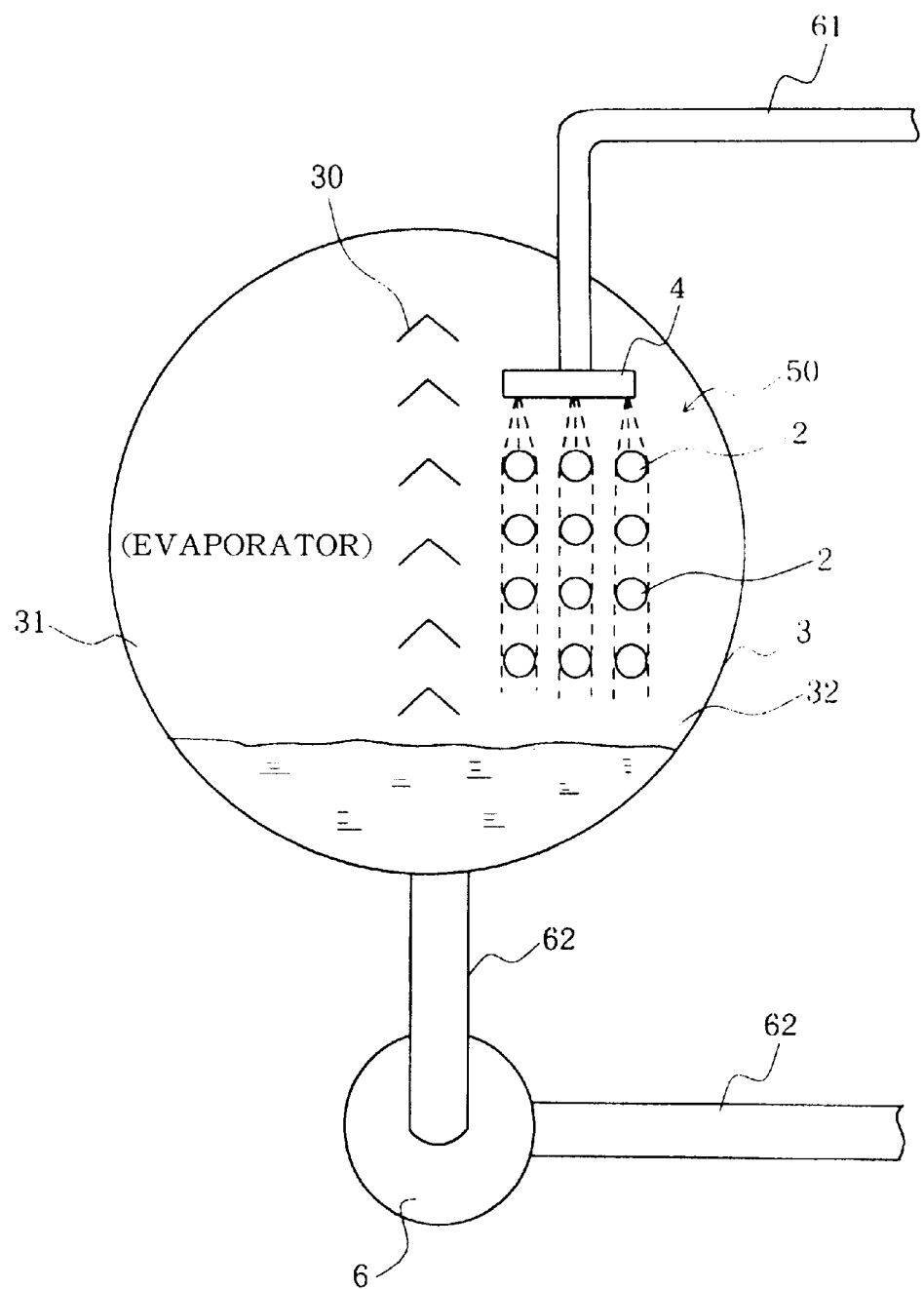
FIG. 17 is a diagram showing an absorber installed in a closed drum and included in a double-effect absorption chiller.

The absorber of this embodiment, like the conventional one shown in FIG. 17, is installed in the absorber chamber 32 of the closed drum 3.

Figure 1:
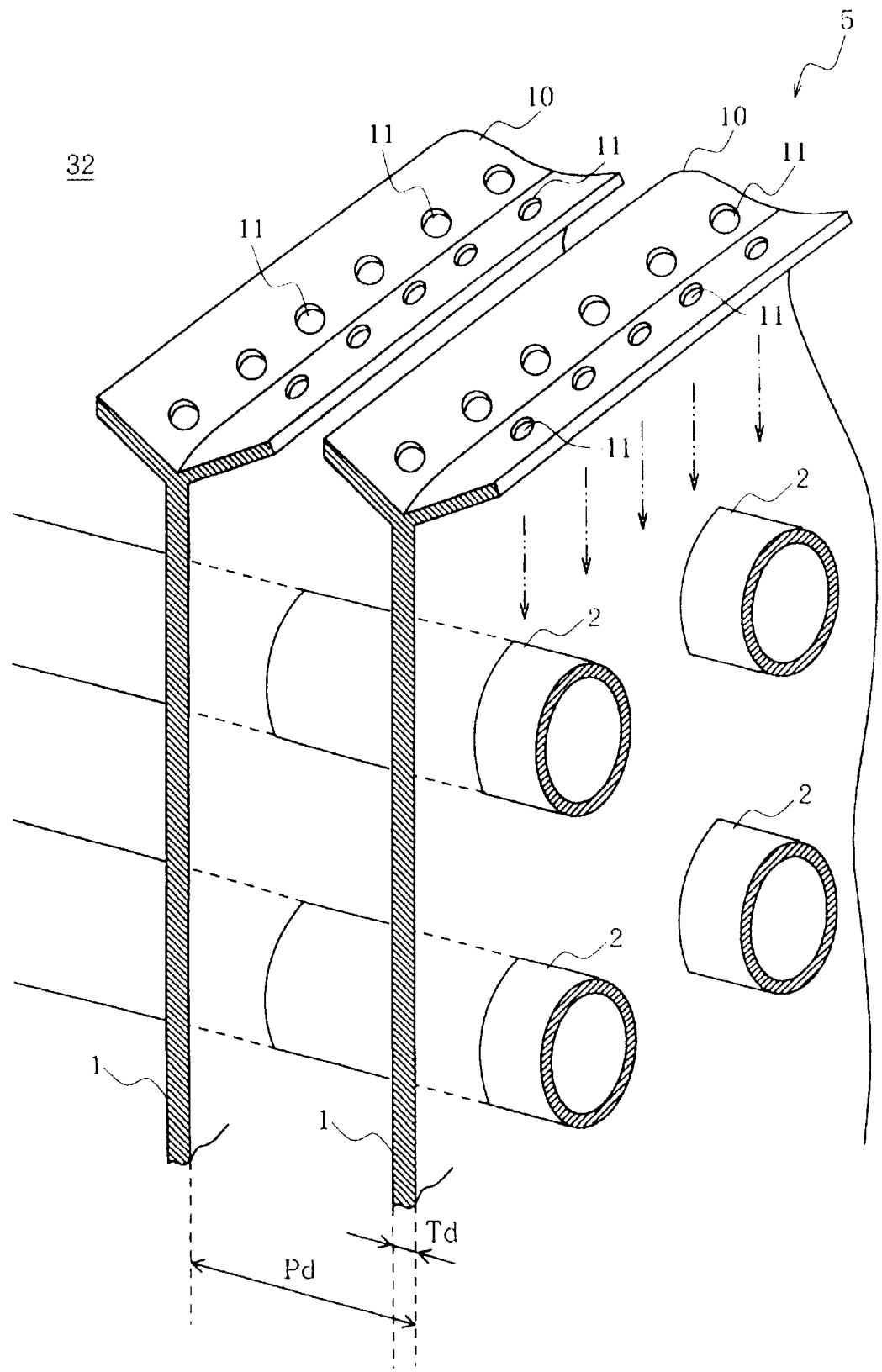
FIG. 1 is a fragmentary perspective view partly broken away and showing an absorber of first embodiment.
Figure 2:
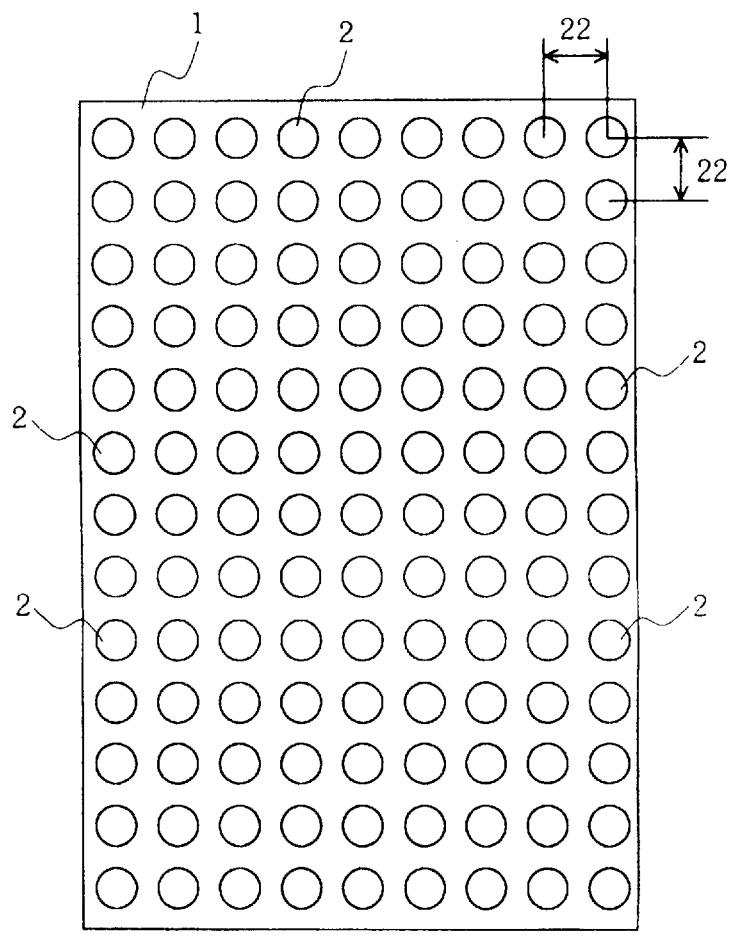
FIG. 2 is a front view showing an arrangement of cooling water pipes included in the absorber.
Figure 3:
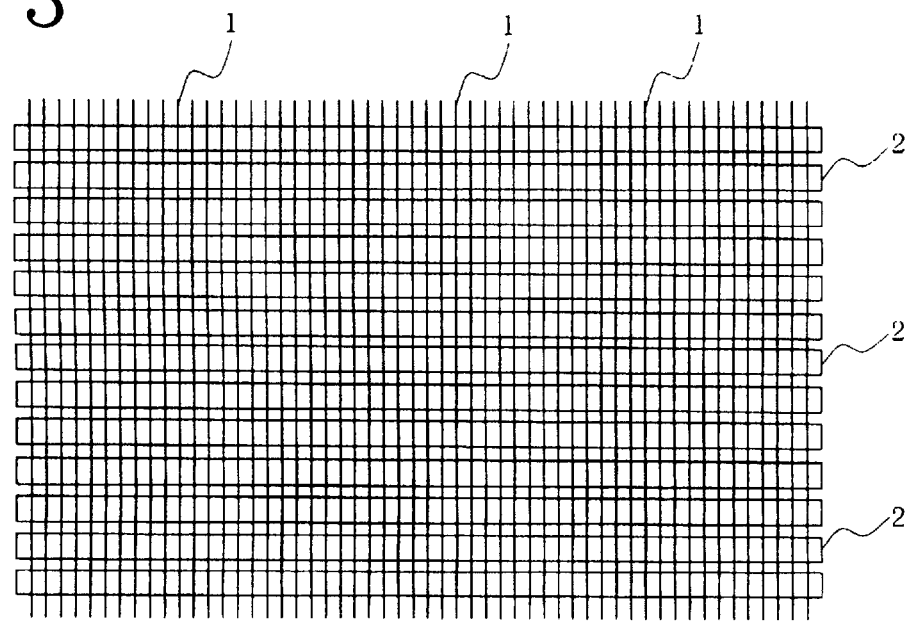
FIG. 3 is a side elevation showing an arrangement of heat transfer plates included in the absorber.

With reference to FIGS. 1 to 3, the absorber 5 of this embodiment comprises a plurality of cooling water pipes 2 extending horizontally and arranged with a pitch, for example, of 22 mm both vertically and horizontally in the interior of the absorber chamber 32. A plurality of flat heat transfer plates 1 are spaced apart from one another and arranged horizontally in a vertical position, and the plurality of cooling water pipes 2 extend through these heat transfer plates 1 perpendicular thereto. A flat copper sheet having a thickness Td of 0.5 mm or the like is usable for the heat transfer plates 1. Alternatively, other known material, such as a sheet of aluminum or the like, is usable for the heat transfer plates 1. The pitch Pd of the plates 1 is 3 to 15 mm.

Each heat transfer plate 1 is integrally formed on its upper end face with an absorbent receptacle 10 V-shaped in cross section and extending longitudinally of the upper end face. The bottom portion of the receptacle 10 is formed with two rows of absorbent holes 11 positioned upwardly of respective surfaces of the plate 1. The holes 11 of each row are spaced apart from one another longitudinally of the plate 1 and each have an outlet adjoining the surface of the plate 1. The absorbent receptacles 10 formed on the respective heat transfer plates 1 provide a downflow distributor.

With the absorber 5 for use in absorption chillers, cooling water is supplied to the pipes 2 to cool the surfaces of the plates 1 and the pipes 2 with the water to a sufficiently lowered temperature.

The absorbent is supplied from the piping 61 shown in FIG. 17 to the receptacles 10 of the present embodiment shown in FIG. 1. The absorbent temporarily remains in each receptacle 10 and then flows out of the outlets of the holes 11. The absorbent flowing out of the outlets of the holes 11 immediately flows along the surfaces of the heat transfer plate 1 as indicated by arrows of two-dot chain lines and further flows down the plate surfaces and the outer peripheral surfaces of the pipes 2 while spreading over the plate surfaces. The absorbent flowing down from the absorbent receptacle 10 wholly flows downward along the plate surfaces without dripping that occurs in the prior art.

While flowing down the surfaces of the heat transfer plates 1, the absorbent absorbs the refrigerant vapor passing between the plates 1 by coming into contact with the refrigerant vapor over a sufficient area. In the meantime, the absorbent wets the surfaces of the plates 1 over large areas. Moreover, the absorbent is slowed down by flow resistance and therefore flows down the surfaces of the heat transfer plates 1 from their upper ends to the lower ends thereof over a sufficient period of time, whereby a large amount of heat is exchanged.

In this way, the absorbent comes into contact with the refrigerant vapor over a large area for the absorption of the vapor, and the resulting heat is effectively removed by sufficient heat exchange, whereby a high absorbing capacity can be obtained.

Figure 4:
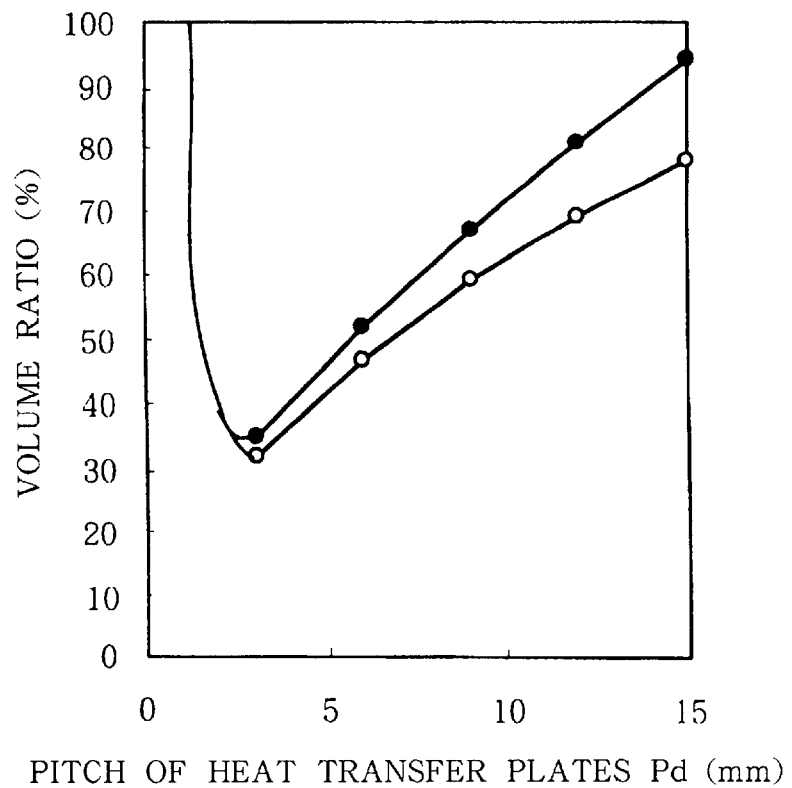
FIG. 4 is a graph showing the results of calculations relating to the absorbing capacity and performed to substantiate the effect of the invention.

FIG. 4 shows the results of calculations relating to the absorbing capacity and performed to substantiate the effect of the invention. Potted as abscissa is the pitch Pd of the heat transfer plates 1, and as ordinate is the ratio (V1/V2) of the volume V1 of the absorber 5 of the invention to the volume V2 of the conventional absorber 50 having the same absorbing capacity as the former. The smaller this ratio, the higher the absorbing capacity of the absorber 5 of the invention.

Figure 5:
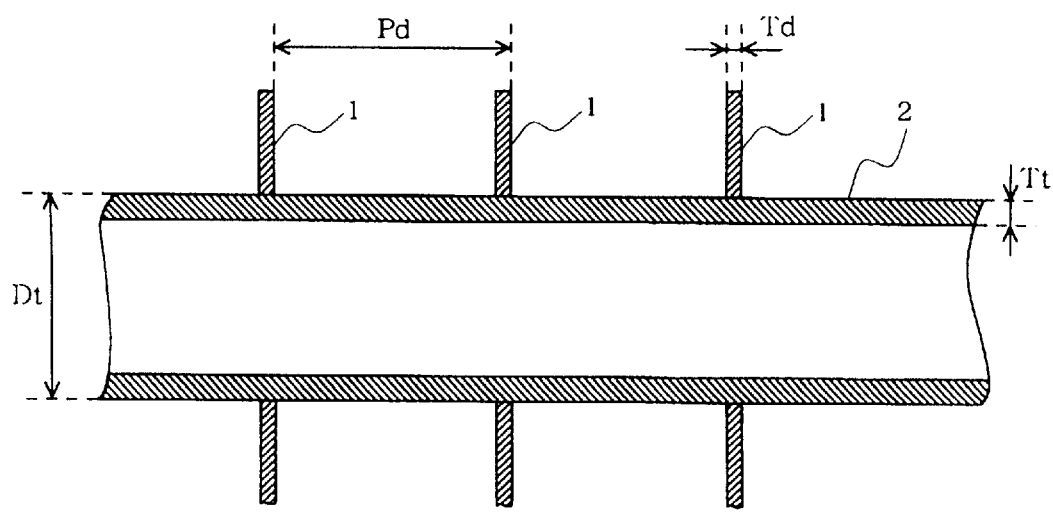
FIG. 5 is a sectional view showing the shapes of heat transfer plates and cooling water pipes used for the calculations.

Volume ratios were calculated using varying values for the pitch Pd of heat transfer plates 1 and assuming that as seen in FIG. 5, the thickness Td of the heat transfer plates 1 was 0.5 mm, the outside diameter Dt of the cooling water pipes 2 was ½ inch or ⅝ inch, the wall thickness Tt of the pipes 2 was 0.6 mm and the flow rate of the cooling water through the pipes 2 was 11.7 m/s. The solid circles plotted on FIG. 4 represent the results obtained when the outside diameter Dt of the pipes 2 was ½ inch, and the blank circles those obtained when the outside diameter Dt was ⅝ inch.

As illustrated, the volume ratio has a minimum value of about 30% when the plate pitch Pd is 3 mm both in the case where the pipe outside diameter Dt is ½ inch and in the case where the diameter Dt is ⅝ inch.

It is also seen that the volume ratio increases gradually as the pitch Pd increases from 3 mm. With a pitch Pd of 15 mm, the volume ratio is about 95% when the pipe outside diameter Dt is ½ inch or about 80% when the diameter Dt is ⅝ inch. The reason is that as the pitch Pd of the plates 1 increases, the number of heat transfer plates 1 arranged over the entire length of the cooling water pipes 2 decreases, reducing the absorbing area of the absorbent and the area ($m^2$) of the plates 1 wetted with the absorbent. When the pitch Pd exceeds 15 mm, the absorber of the invention has nearly the same wetted area as the conventional absorber 50 having no heat transfer plates 1, failing to give an amount of heat exchange much greater than is conventionally available.

Incidentally, FIG. 4 reveals that the volume ratio markedly increases when the plate pitch Pd is smaller than 3 mm because the arrangement of heat transfer plates 1 as positioned closer to one another permits the portions of absorbent flowing down each pair of opposed surfaces to come into contact with each other to flow down as a confluent, which blocks the flow channel of the refrigerant vapor. Consequently, the refrigerant vapor fails to contact the absorbent over a sufficient area to result in a greatly impaired absorbing capacity.

Accordingly, it is desired that the pitch Pd of heat transfer plates 1 be in the range of 3 to 15 mm.

The graph of FIG. 4 reveals that since the absorber 5 of the present embodiment is given a higher absorbing capacity than the conventional absorber 50, the volume required for the desired absorbing capacity can be smaller, making it possible to compact the absorber 5.

Second Embodiment

Whereas the absorber 5 of the first embodiment has the absorbent receptacles 10 integral with the upper end faces of the respective heat transfer plates 1 and serving as a downflow distributor, the absorber 7 of this embodiment has a single absorbent receptacle 8 connected to all heat transfer plates 1 across the upper ends thereof and serving as a downflow distributor.

Figure 6:
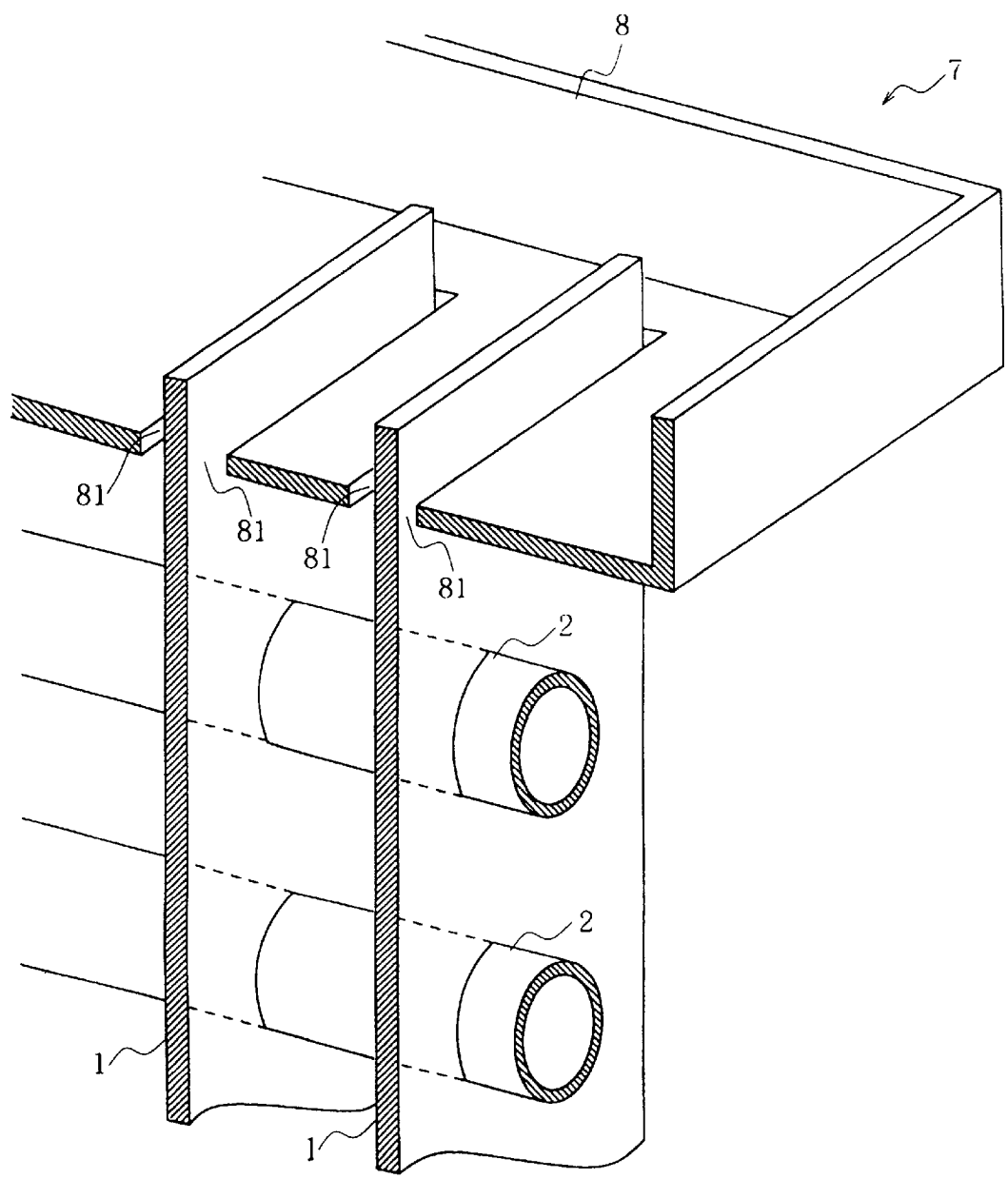
FIG. 6 is a fragmentary perspective view partly broken away and showing an absorber of second embodiment.
Figure 7:
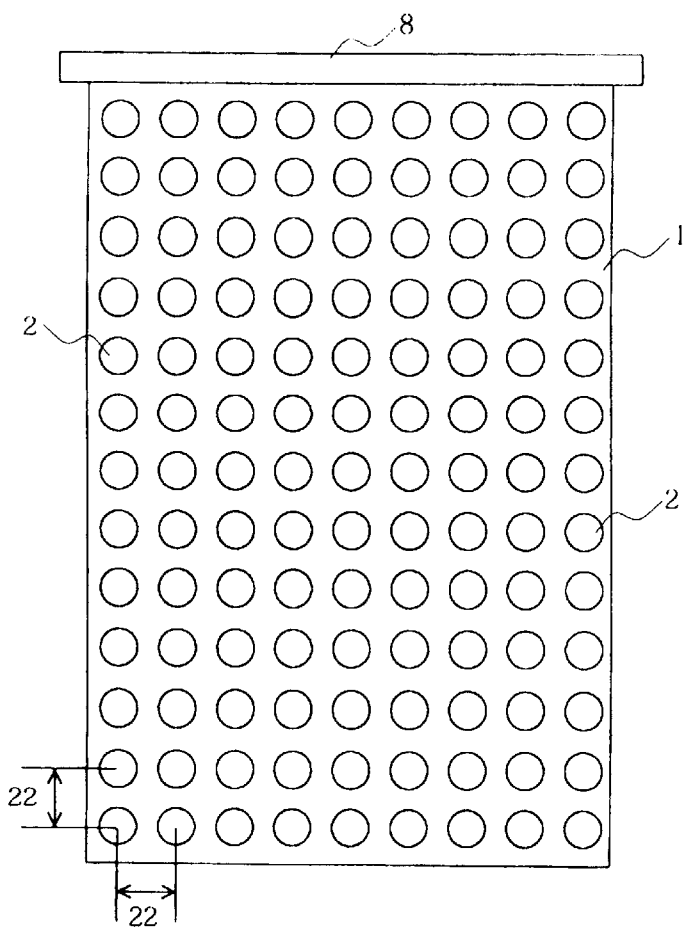
FIG. 7 is a front view showing an arrangement of cooling water pipes included in the absorber.
Figure 8:
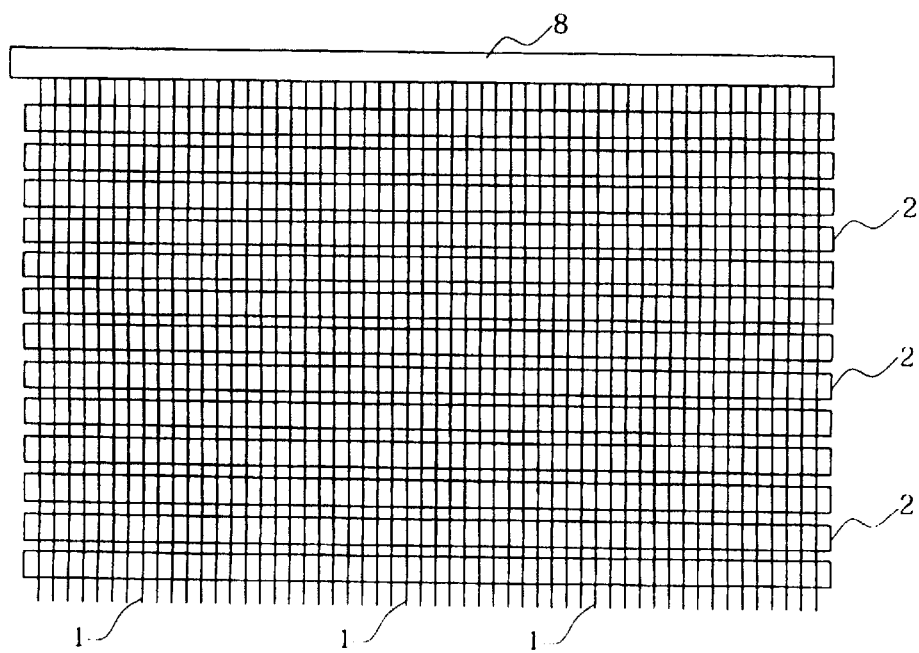
FIG. 8 is a side elevation showing an arrangement of heat transfer plates included in the absorber.

Stated more specifically with reference to FIGS. 6 to 8, a dishlike absorbent receptacle 8 is attached to all heat transfer plates 1 across the upper ends thereof, that is, the upper ends of the heat transfer plates 1 extend through the bottom wall of the absorbent receptacle 8. The bottom wall of the absorbent receptacle 8 has slitlike absorbent holes 81, 81 formed at opposite sides of each heat transfer plate 1 and extending along opposite surfaces of the plate 1.

In this way, the absorbent receptacle 8 extending across the upper ends of all the heat transfer plates 1 is installed as the downflow distributor.

With the absorber 7 for use in absorption chillers, the surfaces of the heat transfer plates 1 and cooling water pipes 2 are cooled with the cooling water through the pipes 2 to a sufficiently lowered temperature as in the first embodiment described.

The absorbent is supplied from the piping 61 shown in FIG. 17 to the receptacle 8 of the present embodiment shown in FIG. 6. The absorbent temporarily remains in the receptacle 8 and then flows out along the surfaces of the heat transfer plates 1 via the holes 81. The absorbent flows out of each hole 81 in the form of a thin film at this time and therefore flows down the surface of the plate 1 while wetting the surface over the entire width thereof. Accordingly, the second embodiment is greater than the first embodiment in the absorbing area of the absorbent and the wetted areas of the surfaces of the heat transfer plates 1.

The second embodiment can consequently be given a higher absorbing capacity than the first embodiment.

Third Embodiment

Figure 13:
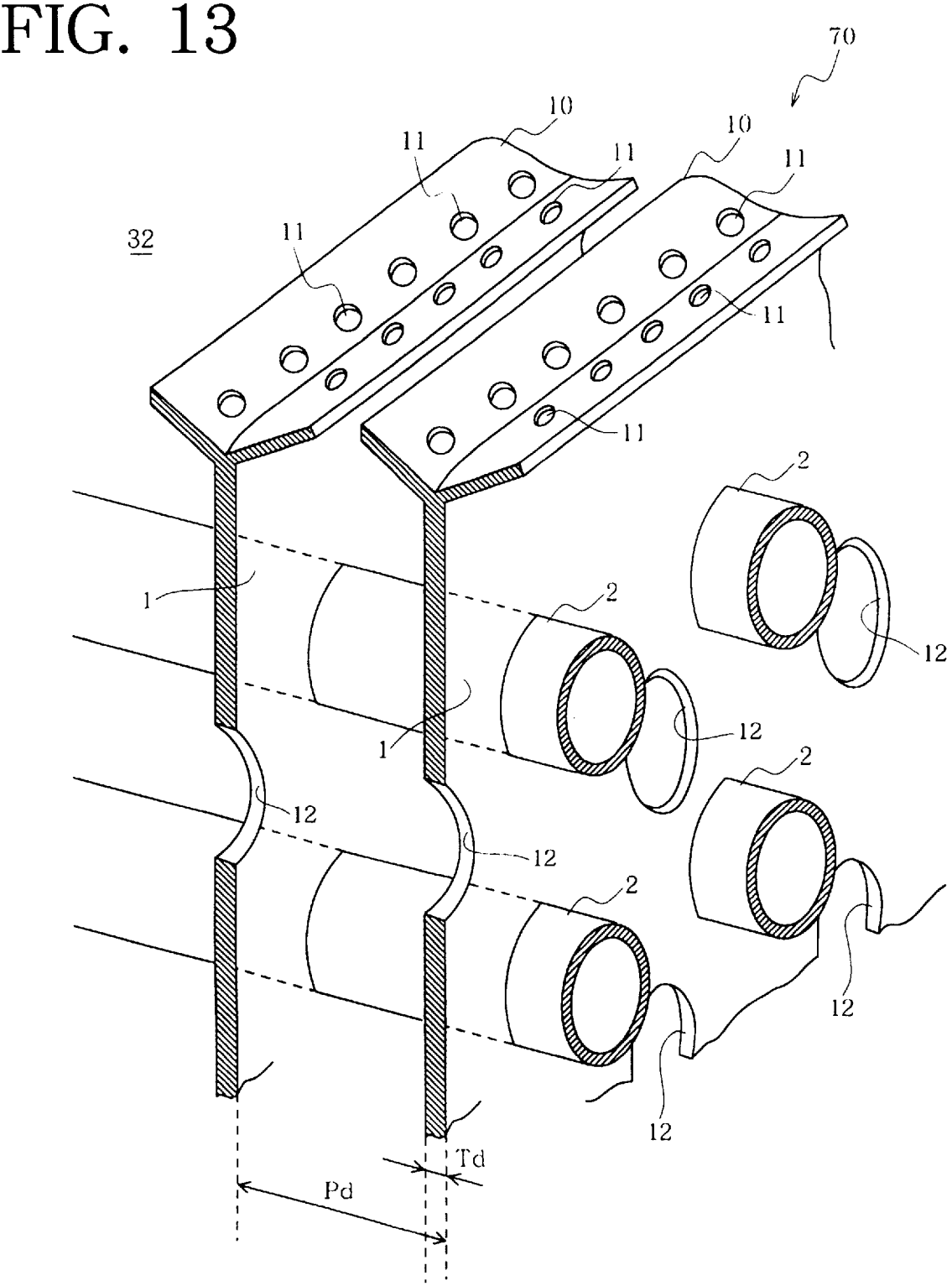
FIG. 13 is a fragmentary perspective view partly broken away and showing an absorber of third embodiment.

As shown in FIG. 13, the absorber 70 of this embodiment has a plurality of vapor passing apertures 12 formed in each of the same heat transfer plates 1 as in the first embodiment.

Cooling water pipes 2 have an outside diameter of 15.9 mm and a length of 2070 mm, are arranged in 17 vertical rows and 18 horizontal rows, and are 306 in total number. On the other hand, the heat transfer plates 1 measure 396 mm ×374 mm ×0.5 mm, are 345 in number and are arranged with a pitch of 6 mm.

Figure 14:
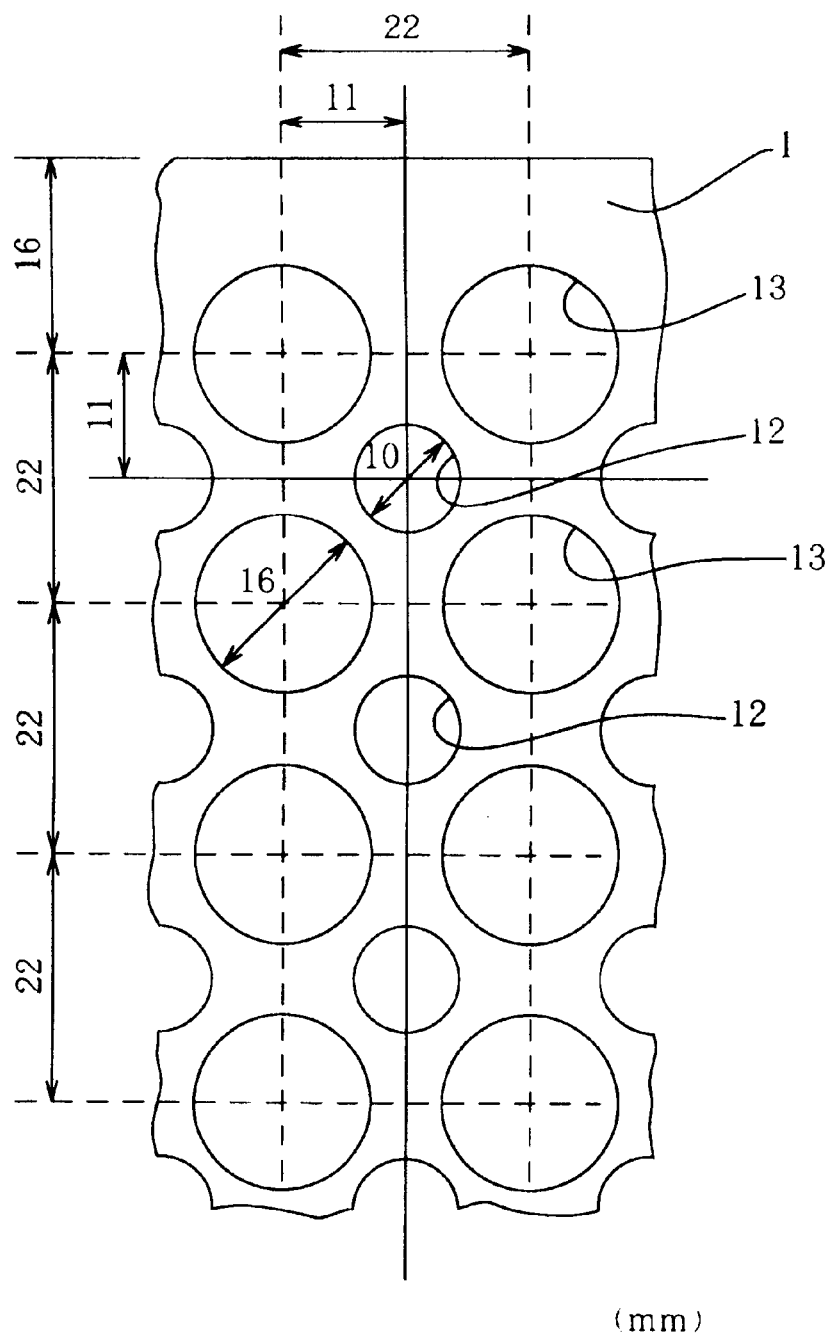
FIG. 14 is a diagram showing the sizes and pitches of vapor passing apertures and cooling water pipe insertions holes formed in a heat transfer plate.

As shown in FIG. 14, the vapor passing apertures 12 have an inside diameter of 10 mm and are formed with the same pitch as cooling water pipe insertion holes 13, i.e., 22 mm.

According to the first and second embodiments described, the absorbent supplied from the absorbent receptacle 10 flows down while wetting the surface of the heat transfer plate 1, and the plate 1 produces the foregoing effect over a surface area wetted by the spread of absorbent, whereas the plate 1 fails to fully exhibit the effect over the other surface area unwet with the absorbent.

Accordingly, with attention directed to the occurrence of the unwet surface area of the heat transfer plate 1, the vapor passing apertures 12 are formed in the plate 1 to cause the refrigerant vapor to flow through the plate 1. Thus, the apertures 12 permit the refrigerant vapor to uniformly flow through the closed chamber 32 without being impeded by the heat transfer plates 1 and to become fully absorbed by the absorbent.

Fourth Embodiment

In the first to third embodiments described, the absorbent wetting the outer peripheral surface of the cooling water pipe 2 will partly fall off the pipe 2 to flow down the surface of the heat transfer plate 1. While thus flowing downward, this portion of absorbent will combine with a downflow portion of the absorbent falling off another cooling water pipe 2 laterally adjacent to the above-mentioned pipe. The confluent flow will then pass between two cooling water pipes 2, 2 arranged at the next lower stage. If the absorbent flows in this way over a wide area of the heat transfer plate 1, this portion of absorbent does not flow over the water pipe 2 and therefore diminishes the direct cooling effect to be produced by the water pipes 2 although the foregoing effect of the heat transfer plate 1 is available. This results in the likelihood that the desired absorbing capacity expected of the first to the third embodiments will not be obtained.

Figure 15:
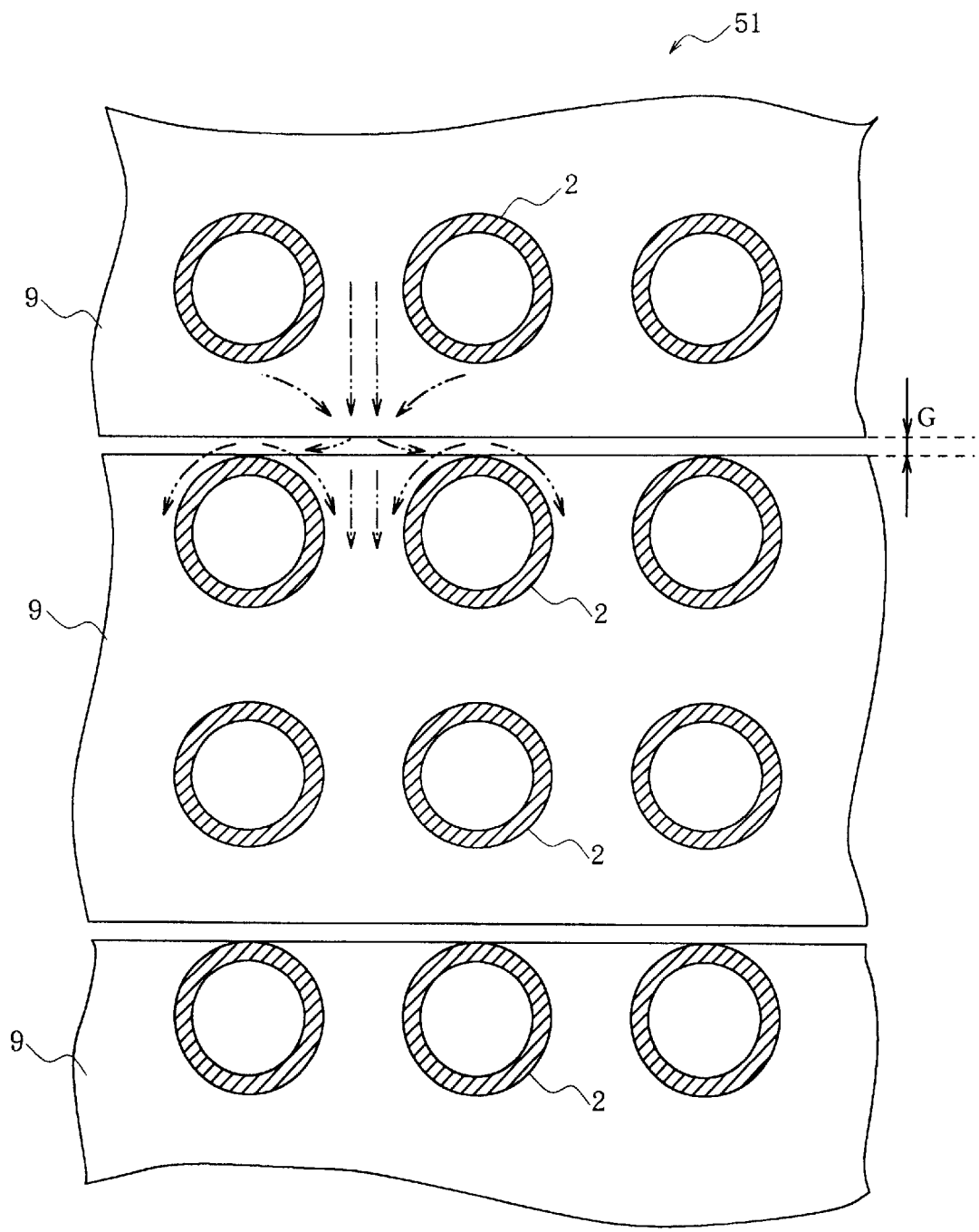
FIG. 15 is a fragmentary sectional view showing an absorber of fourth embodiment.

For use in the absorber 51 of this embodiment, the heat transfer plate 1 is replaced by a plurality of heat transfer plates 9 which extend horizontally as shown in FIG. 15.

These heat transfer plates 9 are arranged one above another in a vertical plane and spaced apart from one another by a clearance G of 2 to 3 mm. Each plate 9 has upper and lower two stages of cooling water pipes 2 extending therethrough. The heat transfer plates 9 other than the plate 9 at the uppermost position each have an upper end face positioned at the same level as the upper ends of outer peripheral surfaces of the cooling water pipes 2 of the upper stage extending through the plate 9. With the exception of the feature described above, the fourth embodiment is the same as the first embodiment shown in FIG. 1. An absorber receptacle 10 is joined to the upper end face of the uppermost plate 9.

With the absorber thus having the absorber receptacle 10 at the upper end face of the uppermost heat transfer plate 9, it is desired that the upper end face of each of the heat transfer plates 9 in the second highest and lower positions other than the uppermost plate 9 be at the same level as the upper ends of outer peripheral surfaces of the cooling water pipes 2 of the uppermost stage extending through the plate 9. On the other hand, when the absorber has the conventional sprinkler 4 as absorbent supplying means but no absorbent receptacle 10, the upper end face of each of all the heat transfer plates 9 including the uppermost plate 9 can be at the same level as the upper ends of outer peripheral surfaces of the uppermost water pipes 2 extending through the plate 9. Alternatively, the upper end face of each of the heat transfer plates 9 in the second highest and lower positions other than the uppermost plate 9 can be at the same level as the upper ends of outer peripheral surfaces of the water pipes 2 of the uppermost stage extending through the plate 9 as in the above case.

In the absorber 51 of this embodiment, the absorbent transfers from each absorbent receptacle 10 to the surface of the heat transfer plate 9 via the absorbent holes 11 and then flows down the surfaces of the plate 9 and the cooling water pipes 2. In this process, the absorbent will flow between two adjacent water pipes 2, 2 or form a confluent flow after flowing over these pipes 2, 2 as indicated by arrows of two-dot chain lines in FIG. 15. Even if flowing in this way, the absorbent partly spreads leftward and rightward along the lower end face of the heat transfer plate 9 or along the upper end face of another heat transfer plate 9 positioned therebelow upon the absorbent flow reaching the plate lower end face. The absorbent then reaches the upper ends of outer peripheral surfaces of cooling water pipes 2, whereupon the absorbent flows down along the pipe outer peripheral surface.

The absorbent thus flowing down the surfaces of heat transfer plates 9 and the outer peripheral surfaces of water pipes 2 spreads as described above every time the absorbent passes across the clearance between the plates 9, to flow down as fully spread not only over the plate 9 and also over the outer peripheral surfaces of water pipes 2. As a result, the heat transfer plates 9 produce the effect described, and the cooling water pipes 2 exhibit a sufficient cooling effect to result in a high absorbing capacity.

Figure 16:
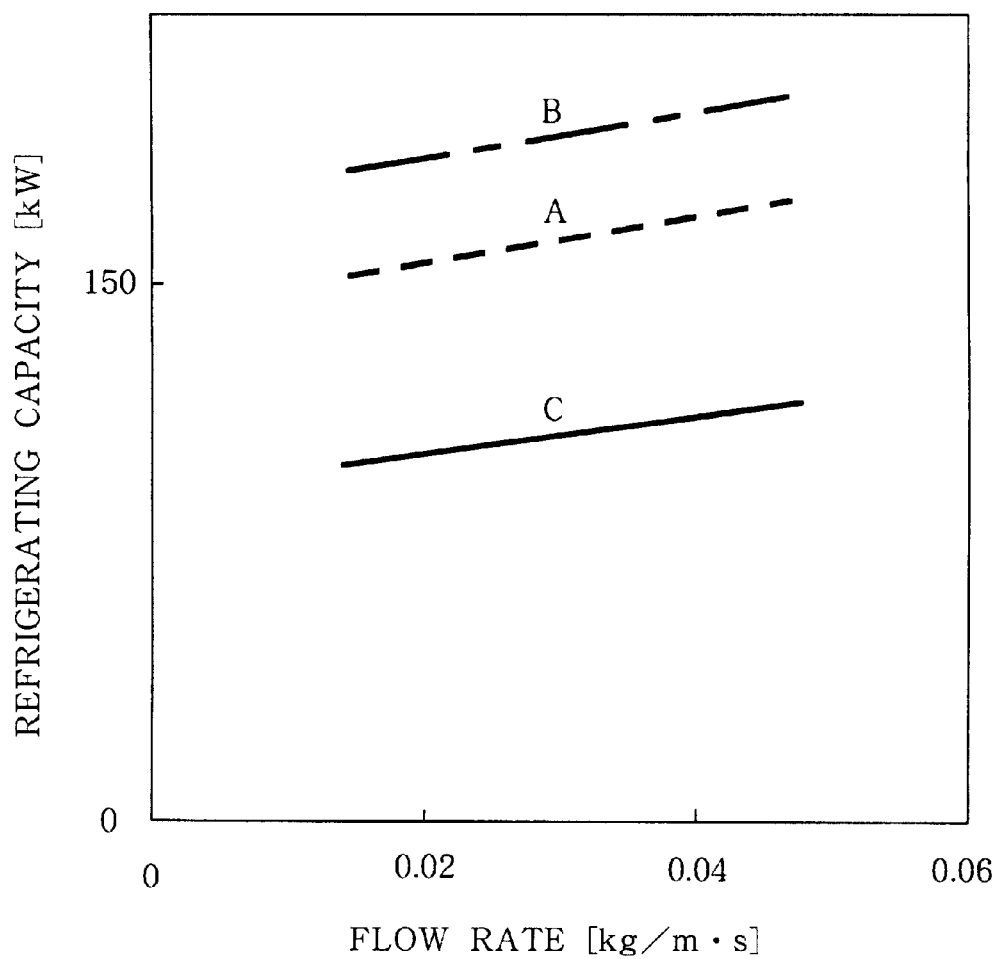
FIG. 16 is a graph showing the relationship between the absorbent flow rate and the refrigerating capacity.

An absorber A of the first embodiment, an absorber B of the fourth embodiment and a conventional absorber C having no heat transfer plate were prepared as compact experimental devices of the same volume, and checked for the relationship between the absorbent flow rate and the refrigerating capacity. The relationships determined, which are shown in FIG. 16, are represented by a broken line for the absorber A of the third embodiment, by a chain line for the absorber B of the fourth embodiment , and by a solid line for the conventional absorber C. The results shown in FIG. 16 are obtained by calculating the refrigerating capacities and absorbent flow rates of the absorbers A, B and C having the foregoing characteristics, based on the refrigerating capacities and absorbent flow rates determined by the experimental devices.

FIG. 16 reveals that the absorber A of the third embodiment having the heat transfer plates 1 formed with vapor passing apertures 12 is greater in refrigerating capacity than the conventional absorber C regardless of the absorbent flow rate.

The absorber B of the fourth embodiment having the heat transfer plates 9 is still greater than the absorber A of the third embodiment in refrigerating capacity.

The absorber of the present invention is not limited to the foregoing embodiments in construction but can be modified variously within the technical scope defined in the appended claims.

Figure 9:
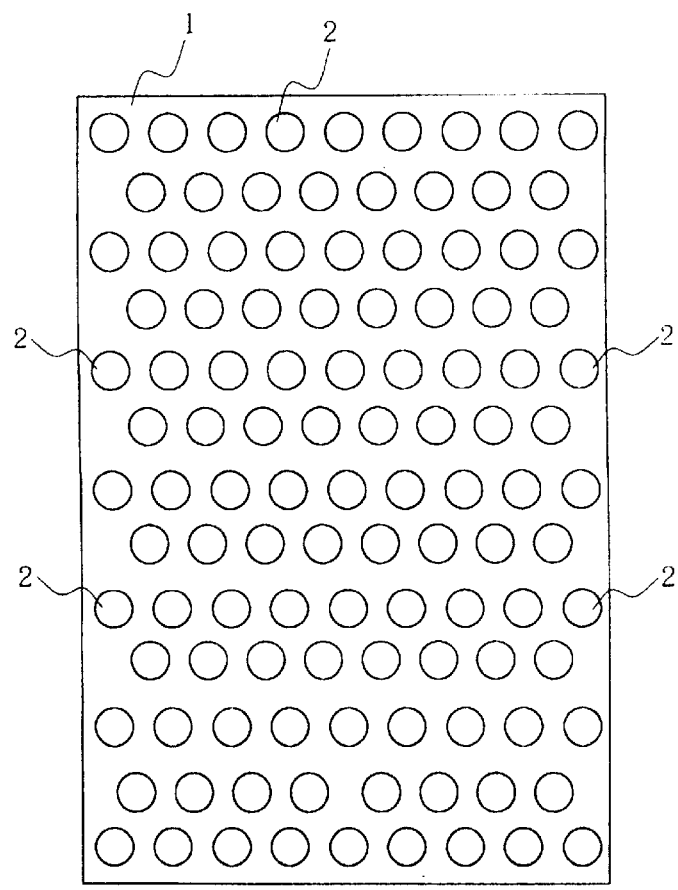
FIG. 9 is a front view showing another arrangement of cooling water pipes.

For example, the cooling water pipes 2 used in the first to fourth embodiments can be in a staggered arrangement as shown in FIG. 9.

Figure 10:
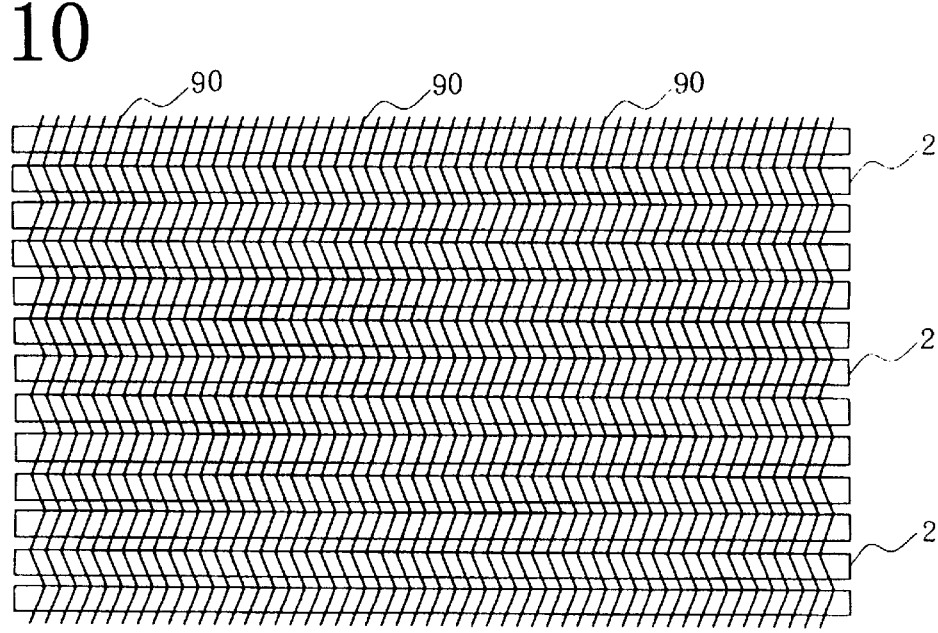
FIG. 10 is a side elevation showing heat transfer plates of different shape.

In place of the flat heat transfer plate 1 or 9, it is possible to use a heat transfer plate 90 which is in the form of a plate corrugated in a vertical direction as shown in FIG. 10. Alternatively it is possible to use a heat transfer plate 91 which is subjected to surface working and thereby formed with ridges and furrows arranged along a vertical direction as shown in FIG. 11, (a) to (c). Use of such heat transfer plates 90 or 91 offers increased flow resistance to the downflow of absorbent to result in a lower flow rate, gives the absorbent a greater absorbing area and permits the absorber to wet the plate over a larger area than when the heat transfer plates 1 or 9 are used which are each in the form of a vertical flat plate, hence a higher absorbing capacity.

Figure 12:
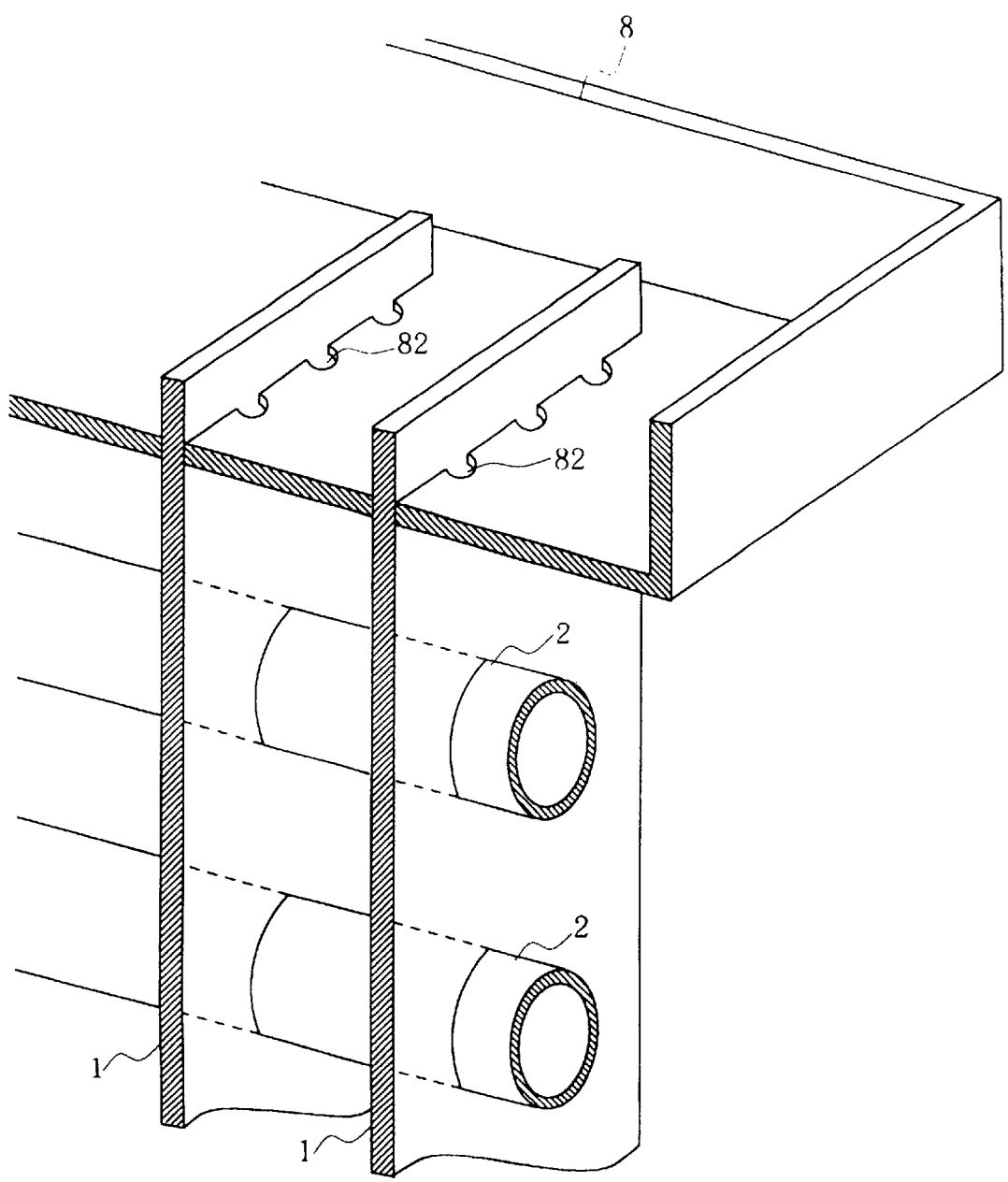
FIG. 12 is a perspective view partly broken away and showing another example of structure having absorbent holes for use in the absorber of second embodiment.

The absorbent hole 81 in the form of a slit and formed in the bottom portion of the absorbent receptacle shown in FIG. 6 can be replaced by a plurality of semicircular absorbent holes 82 shown in FIG. 12.

Further the vapor passing aperture 12 shown in FIG. 13 need not always be circular in form but can be, for example, in the form of a slit which is elongated vertically.

What is claimed is:

1. An absorber for use in absorption chillers which has a closed chamber to be supplied with an absorbent and a refrigerant vapor and having installed therein means for supplying the absorbent, a cooling water piping system positioned below the absorbent supplying means and comprising a plurality of cooling water pipes, the cooling water pipes extending horizontally and being arranged in a plurality of stages spaced apart from one another vertically, the cooling water pipes being interconnected in series or in parallel, and a plurality of platelike heat transfer bodies spaced apart from one another and arranged in a vertical position in a direction to intersect the cooling water pipes, each of the heat transfer bodies comprising a plurality of heat transfer plates extending horizontally and each provided for one or at least two stages of the cooling water pipes, the upper of each pair of heat transfer plates vertically adjacent to each other having a lower end spaced apart by a predetermined clearance from an upper end of the lower of the pair, each of the heat transfer plates having one or at least two stages of the cooling water pipes extending therethrough, all of the heat transfer plates or the heat transfer plates other than the plate at the uppermost position each having an upper end face being positioned at the same level as, or approximately the same level as, upper ends of outer peripheral surfaces of the cooling water pipes positioned at the uppermost stage and extending through the heat transfer plate.

2. An absorber for use in absorption chillers according to claim 1 wherein said clearance is 2 mm to 3 mm.

3. An absorber for use in absorption chillers which has a closed chamber to be supplied with an absorbent and a refrigerant vapor and having installed therein means for supplying the absorbent, a cooling water piping system positioned below the absorbent supplying means and comprising a plurality of cooling water pipes the cooling water pipes extending horizontally and being interconnected in series or in parallel, and a plurality of platelike heat transfer bodies spaced apart from one another and arranged in a vertical position in a direction to intersect the cooling water pipes, the cooling water pipes extending through the heat transfer bodies, the heat transfer bodies being arranged with a pitch of 3 mm to 15 mm.

4. An absorber for use in absorption chillers according to claim 1 or 3 wherein the heat transfer bodies are each in the form of a plate corrugated in a vertical direction.

5. An absorber for use in absorption chillers according to claim 1 or 3 wherein the heat transfer bodies are each subjected to surface working and thereby formed with ridges and furrows arranged along a vertical direction.

6. An absorber for use in absorption chillers according to claim 1 or 3 wherein the heat transfer bodies are each formed with a plurality of vapor passing apertures.

7. An absorber for use in absorption chillers which has a closed chamber to be supplied with an absorbent and a refrigerant vapor and having installed therein means for supplying the absorbent, a cooling water piping system positioned below the absorbent supplying means and comprising a plurality of cooling water pipes, the cooling water pipes extending horizontally and being interconnected in series or in parallel, and a plurality of platelike heat transfer bodies spaced apart from one another and arranged in a vertical position in a direction to intersect the cooling water pipes, the cooling water pipes extending through the heat transfer bodies, the absorbent supplying means comprising a downflow distributor for allowing the absorbent to flow down the plurality of heat transfer bodies, and a feeder for supplying the absorbent to the downflow distributor, the downflow distributor having one or a plurality of absorbent holes for causing the absorbent to flow down toward each of the heat transfer bodies, said one absorbent hole or each of the absorbent holes having an outlet positioned in proximity to a surface of the heat transfer body.

8. An absorber for use in absorption chillers according to claim 7 wherein the downflow distributor comprises a plurality of absorbent receptacles joined to upper end faces of the respective heat transfer bodies, and each of the absorbent receptacles extends longitudinally of the upper end.

9. An absorber for use in absorption chillers according to claim 7 wherein the downflow distributor comprises a single absorbent receptacle connected to all the heat transfer bodies across upper ends thereof and dimensioned to contain the upper ends of all the heat transfer bodies.

10. An absorber for use in absorption chillers according to claim 7 wherein said one absorbent hole or each of the absorbent holes of the dbwnflow distributor is in the form of a slit having an outlet extending along the surface of the heat transfer body.

11. An absorber for use in absorption chillers which has a closed chamber to be supplied with an absorbent and a refrigerant vapor and having installed therein means for supplying the absorbent, a cooling water piping system positioned below the absorbent supplying means and comprising a plurality of cooling water pipes, the cooling water pipes extending horizontally and being interconnected in series or in parallel, and a plurality of platelike heat transfer bodies spaced apart from one another and arranged in a vertical position in a direction to intersect the cooling water pipes, the cooling water pipes extending through the heat transfer bodies, each of the heat transfer bodies being in the form of a plate corrugated in the direction of extension of the cooling water pipes in section along a vertical plane parallel to the direction of extension of the pipes.

12. An absorber for use in absorption chillers which has a closed chamber to be supplied with an absorbent and a refrigerant vapor and having installed therein means for supplying the absorbent, a cooling water piping system positioned below the absorbent supplying means and comprising a plurality of cooling water pipes, the cooling water pipes extending horizontally and being interconnected in series or in parallel, and a plurality of platelike heat transfer bodies spaced apart from one another and arranged in a vertical position in a direction to intersect the cooling water pipes, the cooling water pipes extending through the heat transfer bodies, each of the heat transfer bodies being subjected to surface working and thereby formed with ridges and furrows arranged in the direction of extension of the cooling water pipes in section along a vertical plane parallel to the direction of extension of the pipes.

13. An absorber for use in absorption chillers which has a closed chamber to be supplied with an absorbent and a refrigerant vapor and having installed therein means for supplying the absorbent, a cooling water piping system positioned below the absorbent supplying means and comprising a plurality of cooling water pipes, the cooling water pipes extending horizontally and being interconnected in series or in parallel, and a plurality of platelike heat transfer bodies spaced apart from one another and arranged in a vertical position in a direction to intersect the cooling water pipes, the cooling water pipes extending through the heat transfer bodies, each of the heat transfer bodies being formed with a plurality of vapor passing apertures positioned away from an outer peripheral surface of each cooling water pipe.

14. An absorber for use in absorption chillers according to any of claims 3, 7 or 11 to 13 wherein each of the heat transfer bodies comprises a single heat transfer plate.

* * * * *

UNITED STATES PATENT AND TRADEMARK OFFICE
CERTIFICATE OF CORRECTION

PATENT NO. : 6,192,704 B1  
DATED : February 27, 2001  
INVENTOR(S) : Hiro et al.

Page 1 of 1

It is certified that error appears in the above-identified patent and that said Letters Patent is hereby corrected as shown below:

<u>Column 11,</u>  
Line 3, a comma -- , -- should be inserted between the word "pipes" and "the".  
Line 52, the word "dbwnflow" should be -- downflow --.

Signed and Sealed this

Sixteenth Day of October, 2001

*Attest:*

NICHOLAS P. GODICI  
*Attesting Officer*  *Acting Director of the United States Patent and Trademark Office*